United States Patent
Hall et al.

[15] 3,701,099

[45] Oct. 24, 1972

[54] DYNAMIC DISCRIMINATION REFERENCE LEVEL GENERATOR FOR A PARALLEL CHANNEL OPTICAL DOCUMENT SCANNER

[72] Inventors: Richard E. Hall; Lawrence P. Segar, both of Rochester, Minn.

[73] Assignee: International Business Machines Corporation, Armonk, N.Y.

[22] Filed: June 8, 1971

[21] Appl. No.: 150,935

Related U.S. Application Data

[63] Continuation of Ser. No. 846,834, Aug. 1, 1969, abandoned.

[52] U.S. Cl. ........................................340/146.3 AG

[51] Int. Cl. ............................G06k 9/00, G06k 7/14

[58] Field of Search ..................340/146.3, 146.3 AG

[56] References Cited

UNITED STATES PATENTS

| | | | |
|---|---|---|---|
| 3,192,505 | 6/1965 | Rosenblatt | 340/146.3 AG |
| 3,106,699 | 10/1963 | Kamentsky | 340/146.3 AG |
| 3,159,815 | 12/1964 | Groce | 340/146.3 AG |
| 3,593,285 | 7/1971 | Gillmann | 340/146.3 AG |
| 3,560,931 | 2/1971 | Neville | 340/146.3 AG |

*Primary Examiner*—Maynard R. Wilbur
*Assistant Examiner*—Leo H. Boudreau
*Attorney*—J. Michael Anglin, Carl W. Laumann, Jr. and J. Jancin, Jr.

[57] ABSTRACT

A discrimination reference level generator which provides a dynamically adjustable reference level for discriminating between the white background of a document and black characters imprinted on the document. The maximum contrast signal from document areas on either side of the document area being scanned are used to control the black-white discrimination level of the scanned area. Furthermore, correlation between the discrimination reference levels of adjacent document areas prevents a sudden decrease in the discrimination reference level between two adjacent document areas. The discrimination reference level is not permitted to fall below a predetermined minimum level which is constant for normal contrast but which is automatically raised when there is an extremely high contrast between the document and the characters imprinted thereon.

9 Claims, 6 Drawing Figures

INVENTORS
RICHARD E. HALL
LAWRENCE P. SEGAR

BY Sughrue, Rothwell, Mion, Zinn & MacPeak
ATTORNEYS

PATENTED OCT 24 1972

3,701,099

DYNAMIC DISCRIMINATION REFERENCE LEVEL GENERATOR FOR A PARALLEL CHANNEL OPTICAL DOCUMENT SCANNER

CROSS-REFERENCES TO RELATED APPLICATION

This is a continuation of application Ser. No. 846 834, filed Aug. 1, 1969, now abandoned.

Application Ser. No. 768,706, filed Oct. 18, 1968 and assigned to the assignee of this application, discloses a current ratio amplifier particularly useful for providing character contrast signals of the type which may be used in a parallel channel optical document scanner for which the present invention may provide dynamically adjustable discrimination reference levels.

BACKGROUND OF THE INVENTION

1. Field of the Invention

The invention relates to the field of optical character recognition.

2. Description of the Prior Art

Already broadly known in the prior art are optical character recognition systems incorporating means for automatically varying the discrimination reference level which a video pulse must exceed in order for the pulse to be recognized as a black or character pulse rather than as a white or document background pulse. For example, in one prior art single channel system, the areas of a moving document are time-sampled in series by a rotating slitted disc through which light passes to a photo-multiplier tube. The discrimination reference level for each video pulse is automatically adjusted by varying the cut-off level of a contrast tube in accordance with the greatest amplitude of recently sensed black video pulses.

In another example of the prior art, each video pulse corresponding to a document area being scanned by a two-dimensional array of photo cells is compared with the average value of the video pulses corresponding to areas surrounding the area being scanned, and a black or character recognition signal is generated only when the video pulse corresponding to the scanned area exceeds the average blackness of the surrounding areas.

SUMMARY

The broad object of this invention is to provide an improved discrimination reference level generator for a parallel-channel optical character recognition system whereby the discrimination reference level for each channel is dynamically adjusted in such a manner that the electrical outputs from the document scanning means are invariant with respect to degradations of the characters printed on the document, such degradations being line width and contrast variations, shadowing, shading, voids, fill-in, and smudging.

The invention may be briefly summarized as a discrimination reference level generator for a parallel-channel optical character recognition system wherein the video threshold or discrimination reference level for each channel is determined by the maximum black video pulse found in a predetermined number of adjacent channels. Furthermore, the discrimination reference level of each channel is correlated with that of one or more adjacent channels so that the discrimination reference level cannot suddenly decrease between two adjacent channels. In addition, means is provided to maintain a constant minimum discrimination reference level for documents bearing characters of average or lighter than average contrast; however, means are also provided for increasing this minimum reference level when characters of unusually great contrast or blackness are scanned.

DESCRIPTION OF THE PREFERRED EMBODIMENT

Figure 1:
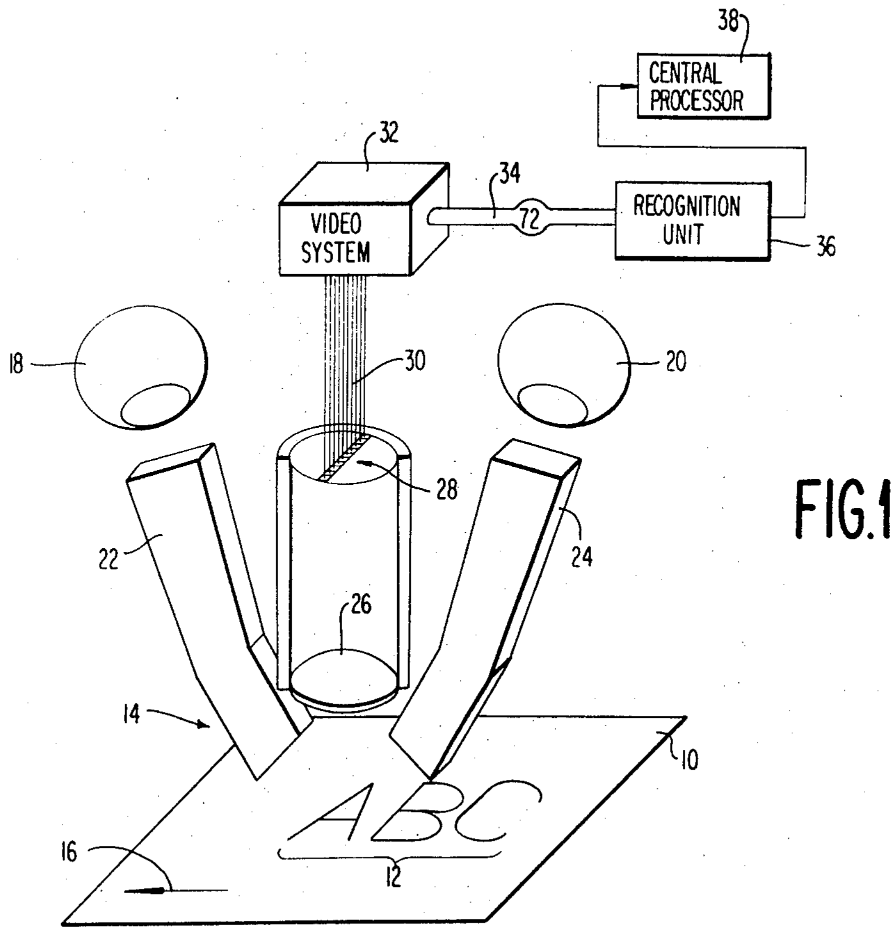
FIG. 1 is a schematic diagram of an optical character recognition system of the type in which the invention may be incorporated.

FIG. 1 is a schematic diagram of an optical character recognition system of the type in which the discrimination function generator of this invention may be used. A document 10 having imprinted thereon characters 12 is moved beneath a scanner 14 in a horizontal direction indicated by the arrow 16. The document has a generally white surface or background of relatively high light reflectance. The characters 12 are black and have a relatively low light reflectance.

Scanner 14 includes a pair of high intensity lamps 18 and 20 and a pair of corresponding light pipes 22 and 24 which direct the high intensity light onto a relatively narrow, vertical line of the moving document. Light reflected from the document is collected by a lens 26 and focused upon a vertical array 28 of parallel photo-diodes. Instead of photo-diodes, other light sensing devices, such as photo-transistors, photo-multipliers, photo-conductors, etc. may be used. In a preferred embodiment, there are 72 photo-diodes which are connected in parallel by a 72 conductor cable 30 to a video system 32. A single vertical line on the moving document is scanned in parallel as the document moves beneath the scanner 14. The vertical scan of the character is obtained by imaging the character on the photo-diode array 28. The amplified and digitized outputs of the photo-diodes are also sampled by means (not shown) at regular time intervals to obtain a horizontal scan across the document. The video system 32 includes the discrimination function generator of this invention and determines whether each point on the document represents a white document background area or a black bit of a character. This determination is made independently of illumination levels, photo-diode sensitivities or other variations which may occur in the system.

In the preferred embodiment, the photo-diodes in array 28 sample the document on five mil increments in the vertical direction, and the time sampling of the photo-diodes is designed to sample the document in the horizontal direction also on five mil increments.

The binary output of the video system 32 is connected by means of a 72 conductor cable 34 to a conventional recognition unit 36 whose output is a signal indicative of the recognized character. This signal may be carried to a central processor 38 for storage, compilation, print-out or the like.

Figure 2:
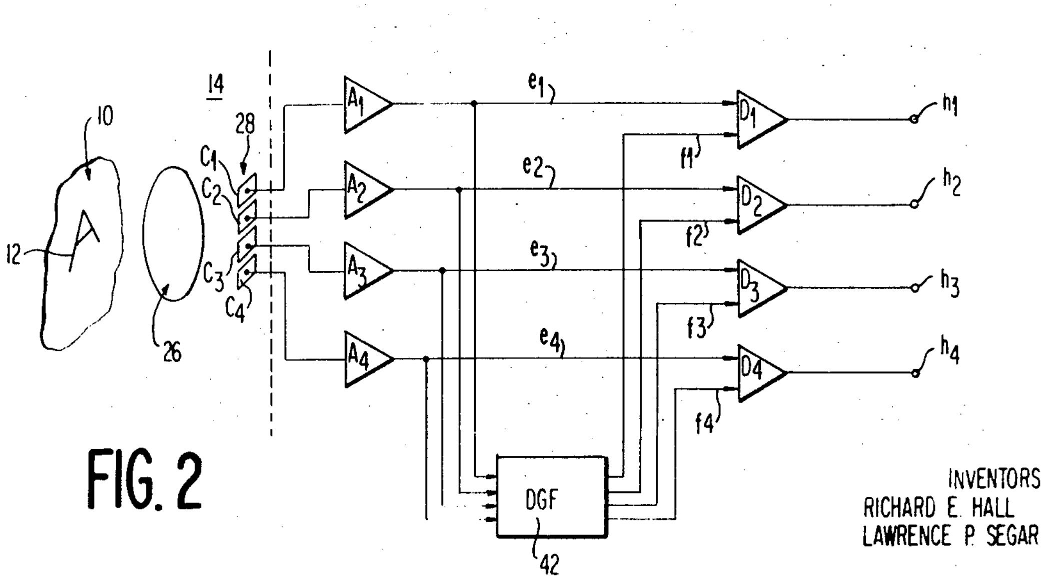
FIG. 2 is a schematic diagram of a portion of FIG. 1 and shows in more detail the scanner and the video system incorporating the discrimination function generator of the invention.

FIG. 2 diagrammatically illustrates in more detail the scanner 14 and video system 32 of FIG. 1. Corresponding portions of FIGS. 1 and 2 have been labeled with the same reference numerals.

Even though in the preferred embodiment illustrated in FIG. 1 the one-dimensional vertical array 28 contains 72 photo-diodes, the array in FIG. 2 is illustrated as containing only four diodes $C_1$, $C_2$, $C_3$and $C_4$. The electrical output of each photo-diode is connected to a corresponding one of four amplifiers $A_1$, $A_2$, $A_3$ and $A_4$. The analog output voltages $e_1$, $e_2$, $e_3$ and $e_4$ of these amplifiers is indicative of the reflectance of the document area sensed by the corresponding one of the photo-diodes $C_1$, $C_2$, $C_3$ and $C_4$. When the documents being scanned have substantially uniform background whiteness, then the outputs of the amplifiers merely represent the light reflectance sensed by the photo diodes since the document reflectance is a constant. However, when the reflectance of the background of the documents varies, it is preferable to choose amplifiers of the type whose outputs are proportional to the actual contrast between the document background and the printed characters scanned by the individual photo diodes. A suitable amplifier is described in copending application Ser. No. 768,706. Such an amplifier is a current ratio amplifier whose output is referenced to the background of the document and thereby provides an analog output voltage proportioanl to the contrast of the area sensed by each photo-diode.

Each of the analog output voltages $e_1$, $e_2$, $e_3$ and $e_4$, is coupled to one input of a corresponding one of four voltage level comparators $D_1$, $D_2$, $D_3$ and $D_4$. The analog outputs are also fed to a discrimination function generator (DFG) 42 which provides individual discrimination reference levels to the second input of each of the comparators $D_1$, $D_2$, $D_3$ and $D_4$. Each of the binary digital outputs $h_1$, $h_2$, $h_3$ and $h_4$ of the comparators is indicative of either a white or black document area sensed by the corresponding one of the photo-diodes $C_1$, $C_2$, $C_3$ and $C_4$. The binary signals $h_1$, $h_2$, $h_3$ and $h_4$ are fed in parallel to recognition unit 36 illustrated in FIG. 1.

The function of the discrimination generator 42 is to provide discrimination reference voltage levels $f_1$, $f_2$, $f_3$ and $f_4$ to the comparators $D_1$, $D_2$, $D_3$ and $D_4$ so that the binary outputs $h_1$, $h_2$, $h_3$ and $h_4$ closely represent outputs that would be obtained from ideal character patterns irrespective of defects which may actually occur in the patterns. As will be described in more detail with respect to FIG. 3, the discrimination reference level provided by the discrimination function generator can be made a function of all of the analog output signals $e_1$, $e_2$, $e_3$ and $e_4$. Furthermore, it is assumed that the amplifiers $A_1$, $A_2$, $A_3$ and $A_4$ function to provide analog output voltages $e_1$, $e_2$, $e_3$ and $e_4$, such that the voltages representing black patterns are greater than those representing white or document background.

Figure 3:
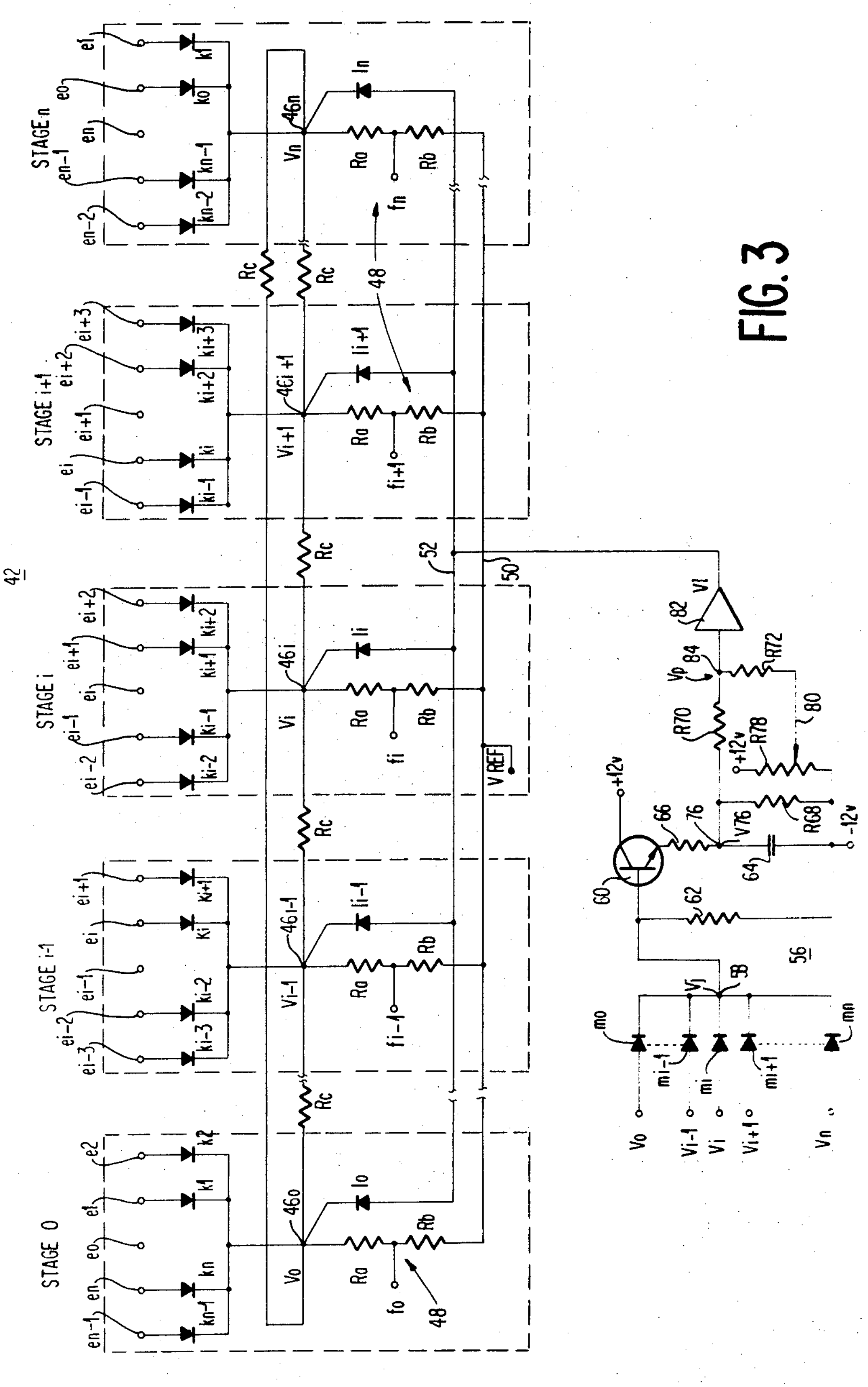
FIG. 3 is a schematic diagram illustrating the details of the preferred embodiment of the discrimination function generator of the invention.

FIG. 3 illustrates a preferred embodiment of the discrimination function generator 42. For the purpose of describing the operation of the invention, only a representative section of the discrimination function generators 42 is illustrated. The discrimination function generator contains the same number of stages as there are channels or photo-diodes in the parallel scanner 14. In the system illustrated in FIG. 1, there are 72 channels, and, therefore, the discrimination function generator illustrated in FIG. 3 would actually contain 72 stages, the stages being numbered 0, 1, 2, 3 . . . $i-1, i, i+1 \ldots n-1, n$, where $n$ equals 71.

In the preferred embodiment illustrated in FIG. 3, the analog video voltages e from the amplifiers A in the two adjacent channels on either side of each channel are connected through individual diodes $k$ to a summing junction 46 which is connected to a resistive ladder network 48. Connected between each junction 46 and a conductor 50 of the latter network is a voltage divider consisting of resistors, $R_a$ and $R_b$. A constant reference voltage $V_{REF}$ is applied to the conductor 50. Connected between each junction 46 and a conductor 52 is diode 1. Applied to conductor 52 is a voltage level $V_1$, which sets a minimum discrimination reference level $V_{MIN}$ for all the channels. The adjusted discrimination reference level voltage $f$ for each channel appears at the junctions 54 of the resistors $R_a$ and $R_b$ in the stage corresponding to the channel.

Let us consider the generation of the discrimination reference level $f_i$ for the $i^{th}$ channel of the optical scanner. There are three cases which must be investigated.

The first case generally occurs when a relatively strong black signal exists in any of the four nearest channels to channel $i$, that is, when any of the amplifier outputs $e_{i-2}$, $e_{i-1}$, $e_{i+1}$, $e_{i+2}$ register black. Even though in this preferred embodiment, the two channels on either side of each channel are coupled to the summing junction 46 in order to produce the discrimination reference level voltage $f$, it is to be understood that more or fewer adjacent channels may be coupled to the junction 46. Again, looking at the junction 46 $i$ for channel $i$, the junction voltage $V_i$ is the maximum voltage of the four amplifier voltages $e_{i-2}$, $e_{i-1}$, $e_{i+1}$, $e_{i+2}$ minus the drop across the corresponding diode $k$. It is assumed that voltages representing black or character areas are greater than those representing white or document back-ground areas.

In this first case, the discrimination reference level voltage $f_i$ is:

$$(1) f_i = (V_i - V_{REF}) (R_b/(R_a+R_b))$$

$V_{REF}$ and the resistors $R_a$ and $R_b$ are suitably chosen so that the discrimination reference levels $f$ produce binary video signals $h_0, h_1 \ldots h_{i-1}, h_i, h_{i+1} \ldots h_{n-1}, h_n$ representing optimal patterns from the optical scanner 14. The exact ratio of the resistors is a function of the transfer function of the amplifiers $A_0, A_1 \ldots A_{i-l}, A_i, A_{i+1}, \ldots A_{n-1}, A_n$.

The second case occurs when the discrimination reference level $f_i$ falls below the minimum reference level $V_{MIN}$. When this condition occurs, voltage $V_1$ is greater than junction voltage $V_i$, so that diode $1_i$ becomes conducting, and:

$$(2) f_i = V_{MIN} = (V_1 - V_{REF})(R_b/(R_a+R_b))$$

The third case occurs when the junction voltage $V$ at an adjacent junction exceeds the junction voltage at the junction in question. In other words, when considering the $i^{th}$ channel, if either $V_{i-1}$ or $V_{i+1}$ exceeds the junction voltage $V_i$, then current flows through a corresponding correlation resistor $R_c$ to cause the junction voltage $V_i$ to exceed the maximum voltage determined by the amplifier voltages $e_{i-2}$, $e_{i-1}$, $e_{i+1}$ and $e_{i+2}$. There is a correlation resistor $R_c$ connected between each adjacent pair of junctions 46. The flow of current permitted by the correlation resistors $R_c$ prevents the discrimination reference level of each channel from abruptly decreasing from the reference level of an adjacent channel. Succeeding adjacent channels may also have their junction voltages increased by the flow of current through successive ones of the resistors $R_c$ of successive adjacent channels to a degree determined by the value chosen for $R_c$.

The manner in which the resistive ladder network 48 functions is well known in the art. Normally a resistive ladder network is terminated in its characteristic impedance at the two ends of the network. However, in this invention, the two end stages, stage 0 and stage *n*, are coupled together by a correlation resistor $R_c$ connected between the junction $46_n$ and the junction $46_0$. Furthermore, to balance the ladder network, the two junctions 46 at each of the extremities of the network are coupled via corresponding diodes *k* to one or two of the amplifier voltages *e* from channels in the opposite end of array 28. These connections can be made because the height of the character 12 on document 10 is generally less than the height of the diode array 28, and the character is generally centered on the array so that the four or five channels at the extremities of the array are always sensing document background. Thus, by closing the ladder network 48 upon itself, the discrimination function generator 42 is made to appear infinitely long.

The minimum voltage level $V_{MIN}$, below which the discrimination reference voltage levels $f_0 \ldots f_i \ldots f_n$ may not fall, is produced by a peak black detector circuit 56 which functions to provide a constant $V_{MIN}$ when the contrast between a character and a document is average or lighter than average, and to increase the level of $V_{MIN}$ when the contrast is extremely high, as, for example, when very black characters are encountered. Individual diodes $m_0 \ldots m_{i-1}, m_i, m_{i+1} \ldots m_n$ are connected between the individual junctions $46_0 \ldots 46_{i-1}$, $46_i$, $46_{i+1} \ldots 46_n$ and the summing junction 58 at the input to the peak black detector circuit 56. The voltage $V_j$ at summing junction 58 follows the maximum voltage $V$ seen on any of the junctions 46 of the *n* video channels. This maximum voltage $V_{j\,MAX}$ is applied to the base of a transistor 60. A resistor 62 is connected between the base and a −12 volt supply to control the base current of the transistor. A capacitor 64 charges through the transistor 60 and an emitter resistor 66 to the voltage $V_{jMAX}$ at node 58. In other words, the capacitor 64 charges to the voltage $V_{jMAX}$ at node 58, the voltage $V_{jMAX}$ being equal to the maximum one of the junction voltages $V_j$ minus the voltage drop across the corresponding diode *m*. The discharge rate of capacitor 64 is determined by the combination of resistor R68 in parallel with the resistors R70 and R72 connected in series. A potentiometer resistor R78 is connected between the −12 volt supply and a+12 volt supply, and an adjustable tap 80 is connected between the potentiometer resistor R78 and the resistor R72. The potentiometer resistor R78 is very small compared to resistors R70 and R72. The time constant of the circuit is suitably chosen to minimize the effects of character shadow and printing spatter while allowing good horizontal shading performance. Character shadow refers to a smudge isolated by a small gap on one side of the character. The capacitor discharge time constant is long enough to prevent sudden changes in $V_{MIN}$ between the time-spaced horizontal scans. An amplifier is connected between the junction of resistors R70 and R72 and the conductor 52. Only a fraction of the voltage $V_{76}$ appearing at the node 76 is applied as a voltage $V_p$ to the node 84 at the input of amplifier 82. This fraction is determined by the ratio of resistor R72 to the sum of resistors R70 and R72. The potentiometer tap 80 is adjusted to maintain the desired minimum level $V_1$ on the output of amplifier 82 for normal and light contrast documents.

In operation, the peak black detector circuit 56 provides the feed back voltage $V_{MIN}$ to the minimum discrimination level diodes $1_0 \ldots 1_{i-1}, 1_i, 1_{i+1} \ldots 1_n$. Looking at the $i^{th}$ stage again, whenever $V_i$ falls below $V_{MIN}$, the diode $1_i$ becomes conducting to apply the voltage $V_{MIN}$ to the junction **46*i***. The discrimination reference level $f_i$ then is determined by equation (2) above.

$V_{MIN}$ in this case is a constant determined by the minimum voltage $V_p$ at node 84 at the input of amplifier 82 as determined by the setting of potentiometer tap 80. However, for extremely high contrast levels, that is, when one of the voltages $V_0 \ldots V_{i-1}, V_i, V_{i+1} \ldots V_n$ exceeds a predetermined level, capacitor 64 begins charging through transistor 60 towards $V_{jMAX}$ so that the input to amplifier 82 is now increased above the minimum $V_p$ determined by the setting of tap 80, thereby increasing the level of $V_p$, and, therefore, $V_1$ and $V_{MIN}$ for high contrast situations.

Figure 4:
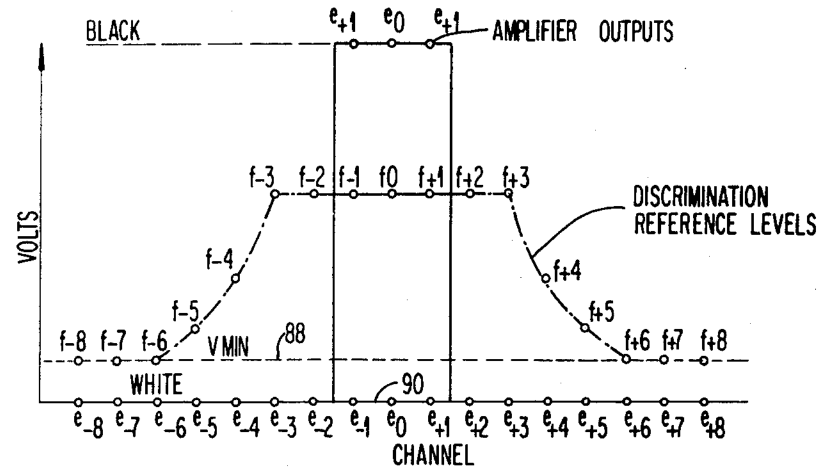
FIG. 4 is a diagram illustrating the manner in which the discrimination reference level of each channel is controlled by adjacent channel video outputs.

The performance of the discrimination function generator of the invention can be visualized with the aid of the diagram illustrated in FIG. 4. 17 channels are indicated along the X axis of the diagram, and the Y axis represents volts. Indicated on the diagram are pertinent values, such as the output voltages *e* of the amplifiers *a*, the discrimination reference level voltages *f*, $V_{MIN}$, and the WHITE level of the document background. In this diagram, it is assumed that $V_{MIN}$ is at the constant value which prevails for average or below average contrasts.

As shown by the diagram, the photo-diodes corresponding to channels −1, 0 and +1 are detecting a heavy black line on the document. Consequently, the amplifier outputs $e_{-1}$, $e_0$ and $e_1$ are at the maximum black level. The other channels $e_{-2}$ through $e_{-8}$ and $e_{+2}$ through $e_{+8}$ are sensing the document background and therefore are at the WHITE level. Consequently, because of the operation of the discrimination function generator illustrated in FIG. 3, not only are the discrimination levels $f_{-1}$, $f_0$ and $f_{+1}$ at the maximum discrimination reference level indicated by line 86, but the discrimination levels $f_{-2}$ and $f_{-3}$ and $f_{+2}$ and $f_{+3}$, corresponding to the two channels adjacent to channels −1 and +1, are also held at the black level 86.

Furthermore, the discrimination reference levels $f_{-5}$ and $f_{-4}$ and $f_{+4}$ and $f_{+5}$ corresponding to channels −5, −4 and +4, +5 are also held above the minimum reference level $V_{MIN}$ due to the conduction of current through the correlation resistors $R_c$, thereby preventing the discrimination reference level from falling suddenly from the maximum level 86 to the minimum level $V_{MIN}$ indicated by the line 88. The function of the correlation resistors $R_c$ is to eliminate noise bits in the vicinity of a character. These resistors provide a one-way action to raise a channel's discrimination reference level whenever it would be exceeded by an adjacent channel's discrimination reference level by more than 20 percent. The discrimination reference level of a channel is not correlated when the adjacent levels are at a lower, rather than a higher, value than the channel in question. It should be understood that $V_{MIN}$ itself may be increased by the action of the peak detector circuit 56 for high contrast situations.

Figure 5:
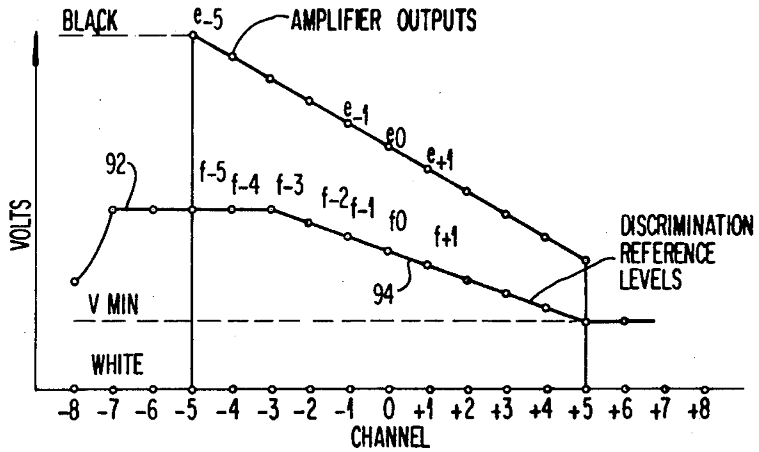
FIG. 5 is a diagram illustrating the manner in which the discrimination reference level varies for a character line which varies in shading; and, FIG. 6 illustrates the manner in which the discrimination reference level is controlled for a filled-in character.

FIG. 5 is a diagram illustrating the manner in which the discrimination reference level is dynamically adjusted when the photo-diodes are sensing a long vertical black character line which gradually shades from black to gray. As illustrated, channels −5 through +5 are sensing the shaded line while the other channels are sensing the white background of the document. Since channel $e_{-5}$ is sensing the blackest portion of the line, both the discrimination reference level $f_{-5}$ for this channel and also $f_{-7}$, $f_{-6}$ and $f_{-4}$, $f_{-3}$ for the two pairs of adjacent channels +7, +6 and +4 +3 are maintained at the maximum discrimination reference level 92 because of the operation of diodes k and the resistive ladder network 48.

From channel −3 to channel +5, the junction voltage $V$ at each of the junctions 46 in cooperation with the resistive dividers formed by the resistors $R_a$ and $R_b$ provides a decreasing discrimination reference level indicated by the sloping line segment 94. Consequently, the reference level for the lighter parts of the line is decreased to assure that the amplifier outputs $e$ also exceed the discrimination reference level for the lighter portions of the line, thereby providing black or character recognition signals h for all portions of the shaded line.

Figure 6:
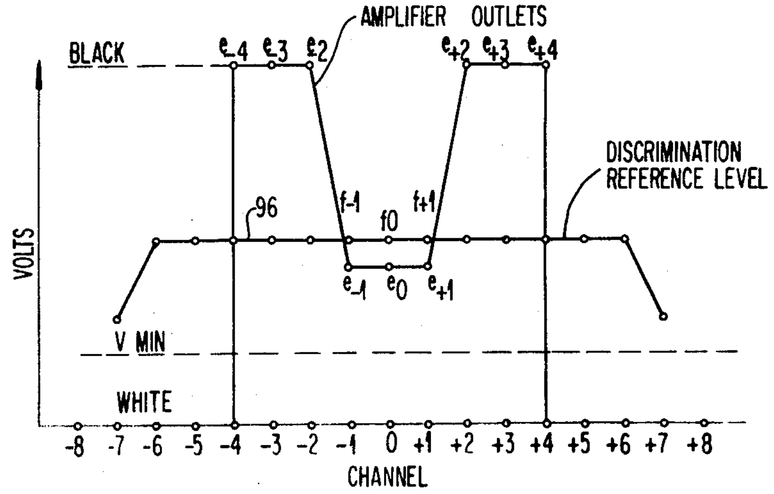

FIG. 6 is a diagram illustrating the manner in which the discrimination reference level is controlled when the photo-diode array 28 senses a pair of vertically spaced character lines, for example, as occur in a "9," wherein the space between the lines is partially filled in by a smudge. Channels −4, −3 and −2 are sensing one line, and channels +2, +3 and +4 are sensing another line. Channels −1, 0 and +1 are sensing a smudge partially filling in the space between the two lines. However, because of the action of the resistive ladder network 48 and the two diodes $k$ adjacent to each of the channels −2 and +2, the discrimination reference levels $f_{-1}$, $f_0$ and $f_{+1}$ are maintained at the maximum black reference level 96 for channels −1, 0 and +1 even though the amplifier voltages $e_{-1}$, $e_0$ and $e_{+1}$ are well below the levels of $e_{-4}$, $e_{-3}$, $e_{-2}$, $e_{+3}$ and $e_{+4}$ but above $V_{MIN}$. Consequently, the recognition signals $h_{-1}$, $h_0$ and $h_{+1}$ for channels −1, 0 and +1 will indicate WHITE or document background rather than black or character lines as would have been the case without the action of the diodes $k$ and the resistive ladder network 48.

There has been described and illustrated a novel discrimination function generator for a one-dimensional parallel optical scanner wherein the discrimination reference levels are dynamically adjusted functions of the optical patterns being sensed. The maximum video signal of adjacent channels is used to determine the discrimination reference level for each channel of the parallel optical scanner. Furthermore, discrimination reference levels among adjacent channels are correlated to prevent a sudden decrease in reference levels between adjacent channels. In addition, the minimum discrimination reference level is increased for high contrast documents. Another unique feature of the invention is the connecting into a ring or loop the resistive ladder network of the discrimination function generator. An additional significant feature of the invention is the very low cost of the implementation of dynamic discrimination reference level generation as compared to prior art systems.

We claim:

1. A discrimination function generator for generating a plurality of variable discrimination reference level signals in a character recognition system wherein a character bearing document is simultaneously scanned by a plurality of light sensing devices to produce a corresponding plurality of video signals having magnitudes indicative of the light reflectance of individual linearly adjacent areas of the document, each area corresponding to a different one of said light sensing devices, comprising:

a. a plurality of stages each adapted to generate a variable discrimination reference level signal for a predetermined one of said video signals, and each of said stages being connected to a predetermined set of said light sensing devices such that each discrimination reference level signal varies as a function of the magnitudes of a predetermined set of said video signals derived from document areas adjacent the document area corresponding to said one predetermined video signal, each set of video signals including at least one video signal that is common to at least one other set of video signals, b. a plurality of correlation means individually interconnected between adjacent ones of said stages, each correlation means being adapted to increase a discrimination reference level signal whenever it is exceeded by a predetermined amount by an adjacent discrimination reference level signal; and c. a plurality of comparator means, each responsive to said predetermined one video signal and to said discrimination reference level signal of one of said stages for producing a binary-valued output signal indicative of the relative magnitudes of said one predetermined video signal and said discrimination reference level signal.

2. A discrimination function generator as defined in claim 1 wherein each discrimination reference level signal is a function of the magnitude of the maximum video signal in the predetermined set from which each discrimination reference level signal is derived.

3. A discrimination function generator as defined in claim 2 wherein each video signal is excluded from the predetermined set of video signals from which its discrimination reference level signal is derived.

4. A discrimination function generator as defined in claim 3 further comprising:

a. means for generating a minimum discrimination reference level signal, and b. means for 1. comparing the maximum video signal in each set with the minimum discrimination reference level signal, and 2. selecting the maximum one of the two compared signals as the discrimination reference level signal.

5. A discrimination function generator as defined in claim 4 further comprising:

a. means for maintaining said minimum reference level signal at a constant level for average and below average character-document contrast, and b. means for increasing the value of said minimum reference level signal for above average character-document contrast.

6. A discrimination function generator for generating a plurality of variable discrimination reference level signals wherein a document is simultaneously scanned by a plurality of light-sensing devices to produce a corresponding plurality of video signals having magnitudes indicative of the light reflectance of individual adjacent areas of the document, each area corresponding to a different one of said light-sensing devices, comprising:

a. a plurality of stages each coupled to a predetermined set of said light-sensing devices for generating a variable discrimination reference level signal for one of said video signals, each discrimination reference level signal being a function of the magnitude of the maximum video signal of a predetermined set of video signals derived from document areas adjacent to but excluding the document area corresponding to said one video signal, each set of video signals including a video signal which is common to at least one other set of video signals;

b. a plurality of correlation means individually interconnected between adjacent ones of said stages, each correlation means being adapted to increase a discrimination reference level signal whenever it is exceeded by a predetermined amount by an adjacent discrimination reference level signal;

c. means for generating a minimum discrimination reference level signal;

d. means for (1) comparing the maximum video signal in each set with the minimum discrimination reference level signal, and (2) selecting the larger one of the two compared signals as the discrimination reference level signal;

e. means for maintaining said minimum reference level signal at a constant level for average and below-average document contrast; and f. means for increasing the value of said minimum reference level signal for above-average document contrast, wherein said value increasing means comprises a peak video signal detecting circuit responsive to the maximum one of said plurality of video signals for increasing the level of said minimum reference level signal.

7. A discrimination function generator as defined in claim 1 wherein said plurality of stages comprises:

a. a resistive ladder network comprising a plurality of resistive dividers each corresponding to a different one of said plurality of video signals, and b. means coupling each said set of video signals to a corresponding resistive divider for producing said discrimination reference level signal.

8. A discrimination function generator for generating a plurality of variable discrimination reference level signals in a system wherein a document is simultaneously scanned by a plurality of light-sensing devices to produce a corresponding plurality of video signals having magnitudes indicative of the light reflectance of individual adjacent areas of the document, each area corresponding to a different one of said light-sensing devices, comprising:

a. a plurality of stages each coupled to a predetermined set of said light-sensing devices for generating a variable discrimination reference level signal for a different one of said video signals, each discrimination reference level signal being a function of the magnitudes of a predetermined set of video signals derived from document areas adjacent the document area corresponding to said one video signal, each set of video signals including a video signal which is common to at least one other set of video signals, said plurality of stages including a resistive ladder network having a plurality of resistive dividers each corresponding to a different one of said plurality of video signals, and means coupling each set of video signals to a corresponding resistive divider for producing said discrimination reference level signals; and b. a plurality of correlation means individually interconnected between adjacent ones of said stages, each correlation means being adapted to increase one of said discrimination reference level signals whenever it is exceeded by a predetermined amount by an adjacent discrimination reference level signal, wherein said correlation means comprises a resistor connected between adjacent ones of said resistive dividers, whereby each discrimination reference level signal is increased whenever it is exceeded by an adjacent discrimination reference level signal.

9. A discrimination function generator as defined in claim 8 further comprising a correlation resistor connected between the resistive dividers on opposite ends of said resistive ladder network.

* * * * *